US008696770B2

(12) United States Patent
Jeong

(10) Patent No.: US 8,696,770 B2
(45) Date of Patent: Apr. 15, 2014

(54) APPARATUS AND METHOD FOR RECYCLING COAL ASH

(75) Inventor: Young Ho Jeong, Seoul (KR)

(73) Assignee: Ceragreen Co., Ltd., Chungcheongnam-Do (KR)

( * ) Notice: Subject to any disclaimer, the term of this patent is extended or adjusted under 35 U.S.C. 154(b) by 309 days.

(21) Appl. No.: 13/002,585

(22) PCT Filed: Jul. 3, 2009

(86) PCT No.: PCT/KR2009/003639
§ 371 (c)(1),
(2), (4) Date: Mar. 31, 2011

(87) PCT Pub. No.: WO2010/002216
PCT Pub. Date: Jan. 7, 2010

(65) Prior Publication Data
US 2011/0173878 A1    Jul. 21, 2011

(30) Foreign Application Priority Data
Jul. 4, 2008    (KR) .................. 10-2008-0064803

(51) Int. Cl.
*C10L 5/00* (2006.01)
*B03C 1/00* (2006.01)
*B07B 15/00* (2006.01)
*B07B 1/00* (2006.01)
*B02C 23/00* (2006.01)

(52) U.S. Cl.
USPC ................. 44/620; 209/10; 209/3; 241/101.2

(58) Field of Classification Search
USPC .................. 44/620; 209/10, 3; 241/101.2
See application file for complete search history.

(56) References Cited

U.S. PATENT DOCUMENTS 5,992,336 A    11/1999    Ramme

FOREIGN PATENT DOCUMENTS

| KR | 20030048225 A | 6/2003 |
| KR | 20030064572 A | 8/2003 |
| KR | 100668953 B1 | 1/2007 |

OTHER PUBLICATIONS

Lee et al.; KR 10-0430894 (Taesung Construction Co.; Taewon Construction Co.) May 10, 2004.*

* cited by examiner

*Primary Examiner* — Prem C Singh
*Assistant Examiner* — Chantel Graham
(74) *Attorney, Agent, or Firm* — Tristan A. Fuierer; Andrew D. Gerschutz; Moore & Van Allen, PLLC

(57) ABSTRACT

The present invention relates to an apparatus and method for recycling coal ash comprising an unburned coal ash recovery unit and a lightweight aggregate manufacturing unit and is provided in an existing thermoelectric power plant and in which coal ash generated in the thermoelectric power plant is completely recycled for specific purposes using the coal ash recycling apparatus. According to the invention, the surrounding environment can be prevented from being contaminated during the transportation of waste to a recycling factory and transportation expenses can be reduced. Moreover, coal ash is completely recycled for specific uses, such that unburned carbon contained in the coal ash can be used. Also, coal ash can be recycled even as concrete admixtures having strict standards. In addition, the present invention can prevent environmental contamination caused by the landfilling of waste and recycle waste, thereby reducing the loss of land and the waste of resources.

7 Claims, 4 Drawing Sheets

Table 3

| Particle size | No. 1 | No. 2 |
|---|---|---|
| 5mm or more |  |  |
| 2~5mm |  |  |
| 0.6~2mm |  |  |

[Table 5]

| section | image | a density in saturated surface-dry state g/cm³ | absorption rate (%) | a fineness modulus (%) | potential alkali reactivity (mmol/L) | | |
|---|---|---|---|---|---|---|---|
| | | | | | amount of dissolved silica(Sc) | Reduced alkali concentration (Rc) | |
| lightweight aggregate 1 |  | 1.45 | 16.29 | 6.87 | 198.25 | 220.3 | |
| | | | | | unhazardous aggregate | | |
| lightweight aggregate 2 |  | 1.68 | 15.26 | 6.76 | 198.14 | 292.9 | |
| | | | | | unhazardous aggregate | | |

APPARATUS AND METHOD FOR RECYCLING COAL ASH

CROSS-REFERENCE TO RELATED APPLICATIONS

This application is filed under the provisions of 35 U.S.C. §371 and claims the priority of International Patent Application No. PCT/KR2009/003639 filed on 3 Jul. 2009 entitled "Coal Ash Recycle Device and Method Therefor" in the name of Young Ho JEONG, which claims priority of Korean Patent Application No. 10-2008-0064803 filed on 4 Jul. 2008, both of which are hereby incorporated by reference herein in their entirety.

TECHNICAL FIELD

The present invention relates to an apparatus and method for recycling coal ash, and more particularly to an apparatus and method for recycling coal ash, in which the apparatus for recycling coal ash comprises an unburned coal ash recovery unit and a lightweight aggregate manufacturing unit and is provided in an existing thermoelectric power plant and in which coal ash which is generated in the thermoelectric power plant is completely recycled for specific purposes using the coal ash recycling apparatus.

BACKGROUND ART

As shown in FIG. 1, in a thermoelectric power plant that generates electricity using coal, electricity is generally generated by pulverizing coal to a specific size in order to promote the burning of coal, that is, preparing pulverized coal, and feeding the pulverized coal into a boiler in which the coal is burned, and at the same time, producing high-temperature and high-pressure steam and feeding the produced steam into a steam turbine.

In particular, coal generally contains about 2-15% non-combustible ash, that is, coal ash. Thus, when pulverized ash is fed into a boiler, coal ash accounting for about 20% of the pulverized coal is melted by the high-temperature heat of combustion, a number of particles are condensed and drop to the bottom of the boiler, about 80% of the pulverized coal is burned and scatters together with the flow of flue gas, and coal ash contained in the scattered pulverized coal is collected by a dust collecting unit such as an electrostatic precipitator.

The type of coal ash that drops to the bottom of the boiler is called "bottom ash". The bottom ash particles drop to the bottom of the boiler by the weight thereof after being attached to the furnace wall, a super-heater, a reheater or the like and have a particle size of about 1-5 mm. The bottom ash particles are collected at the bottom of the boiler and ground with a grinder, and then sent to an ash transfer tank. The bottom ash particles in the ash transfer tanks are mostly disposed of in an ash landfill. Because the bottom ash has non-uniform particle size and distribution and inferior quality, it is completely is landfilled in breakwaters built into the sea.

Also, the type of coal ash, which scatters from the fluidized-bed boiler and is collected by the electrostatic precipitator, is called "fly ash", which is collected in a hopper below an economizer or an air preheater and which is captured by the electrostatic precipitator and collected in a hopper below the electrostatic precipitator. The type of fly ash that is collected in the hopper below the economizer or the air preheater has a particle size of 0.3-0.1 µm and accounts for about 5% of the coal ash generated, and the type of fly ash, which is captured by the electrostatic precipitator and collected in the hopper below the electrostatic precipitator has various particle sizes depending on the type of coal or combustion conditions, accounts for about 75-80% of the coal ash generated, and is mostly recycled. Fly ash which is not recycled is sent to the ash transfer tank and disposed of in an ash landfill, like the case of the bottom ash.

The coal ash consisting of a heterogeneous mixture of fly ash and bottom ash, which are disposed of in a landfill, is called "reclaimed ash", and the physical properties of the reclaimed ash greatly differ depending on the place and time when the reclaimed ash is landfilled. Because of this disadvantage, in order for the reclaimed ash to be used in concrete aggregates and the like, the reclaimed ash stored in an ash pond is screened according to particle size and subjected to a washing process and the like. Even if the reclaimed ash is recycled in this manner, there is a problem in that coal ash remaining after the screening process should be disposed of.

Also, the use of only a portion of reclaimed ash from an additional process for recycling the reclaimed ash causes an increase in the production cost of aggregates and is undesirable in terms of the efficiency of resource recycling.

In Korea, about 1,100 thousand tons of coal ash was generated in the year 2002, and the reclamation of coal ash has problems in that it is difficult to ensure and maintain a landfill, residents neighboring the landfill suffer inconvenience due to fugitive dust, and the reclaimed coal ash flows out in the rainy season to contaminate the surrounding environment.

U.S. Pat. No. 5,992,336 discloses reburning a mixture of bottom ash and coal to reduce fuel expenses and waste. However, there is a problem in that the coal ash generated should be disposed of after the reburning process.

Also, Korean Patent Registration No. 0447739 discloses a concrete composition comprising bottom ash and a preparation method thereof, in which bottom ash is separated into coarse aggregate and fine aggregate, which are used as concrete aggregate substitutes. Moreover, Korean Patent Registration No. 0470676 discloses a concrete composition using of bottom as as replacement of aggregate for concrete mixing, and Korean Patent Registration No. 0668953 discloses a method for correcting the accuracy, compressive strength and slump of concrete using reclaimed coal ash.

However, when reclaimed coal ash or bottom ash is recycled as a concrete aggregate substitute as described above, the reclaimed coal ash and the bottom ash have various water contents depending on particle size when used as a concrete aggregate and makes it difficult to ensure the slump and strength of concrete manufactured therefrom, because they contain unrefined fly ash at various ratios and have a very non-uniform particle size distribution, and the strength of the bottom ash differs depending on particle size and shape. Thus, it is significantly difficult to practically use reclaimed coal ash in concrete. Also, in order to manufacture concrete from reclaimed ash or bottom ash in a stable manner, it is necessary to carry out a process of separating the reclaimed ash or the bottom ash into coarse aggregate and fine aggregate after a washing process, but these additional processes such as the particle size separation process can increase the production cost of the aggregate and are undesirable in terms of the efficiency of resource recycling. For these reasons, the use of reclaimed coal ash has not provided satisfactory results in economic and technical terms.

Accordingly, the present inventors have made many efforts to solve the above-described problems occurring in the prior art and, as a result, have found that, when a coal ash recycling apparatus comprising a unburned coal ash recovery unit and a lightweight aggregate manufacturing unit is provided in a thermoelectric power plant and is used to recycle various types of coal ash (fly ash, bottom ash, reclaimed ash, etc.) which are generated in the thermoelectric power plant, each type of coal ash which is generated in the thermoelectric power plant can be completely recycled for specific uses, unlike the prior art in which each type of coal ash is partially recycled, thereby completing the present invention.

DISCLOSURE OF INVENTION

It is an object of the present invention to provide an apparatus and method for recycling coal ash, which allow each type of coal ash, which is generated in a thermoelectric power plant, to be completely recycled for specific uses, unlike the prior art in which each type of coal ash is partially recycled.

To achieve the above object, the present invention provides an apparatus for recycling coal ash, the apparatus comprising: an unburned coal ash recovery unit for selectively recovering unburned coal ash having a particle size of 2 mm or more from coal ash which is generated from a thermoelectric power plant that generates electricity by burning coal; and an aggregate manufacturing unit for manufacturing aggregate using coal ash remaining after recovering the unburned coal ash through the unburned coal ash recovery unit.

The present invention also provides a method for recycling coal ash, in which coal ash selected from a group consisting of fly ash, bottom ash, reclaimed ash, and mixtures thereof is recycled for specific uses using the apparatus for recycling coal ash.

The present invention also provides a method for manufacturing lightweight aggregate, the method comprising the steps of: (a) grinding burned coal ash or coal ash having a particle size of less than 2 mm, recovered through an unburned coal ash recovery unit comprising a screening machine 20 for screening coal ash, generated in a thermoelectric power plant, according to particle size using a plurality of screens; a plurality of first feed silos 21 for separately storing the coal ash screened in the screening machine 20; a magnetic separator 22 for separating the coal ash, stored in the first feed silo 21, into a burned portion and an unburned portion using an electromagnet; a plurality of second feed silos 23 for separately recovering the coal ash portions separated by the magnetic separator 22; an unburned coal ash silo 24 for recovering unburned coal ash having a specific particle size or greater from the second feed silos 23 and storing the recovered unburned coal ash; and a bottom ash silo 25 for recovering burned coal ash or coal ash having a particle size of less than 2 mm from the first feed silos 21 and the second feed silos 23 and storing the recovered coal ash; (b) preparing an aggregate mixture by mixing and kneading the ground coal ash with raw material for aggregate; (c) manufacturing a aggregate formed material by forming the prepared aggregate mixture into aggregate form; and (d) manufacturing aggregate by calcining the aggregate formed material.

Figure 1:
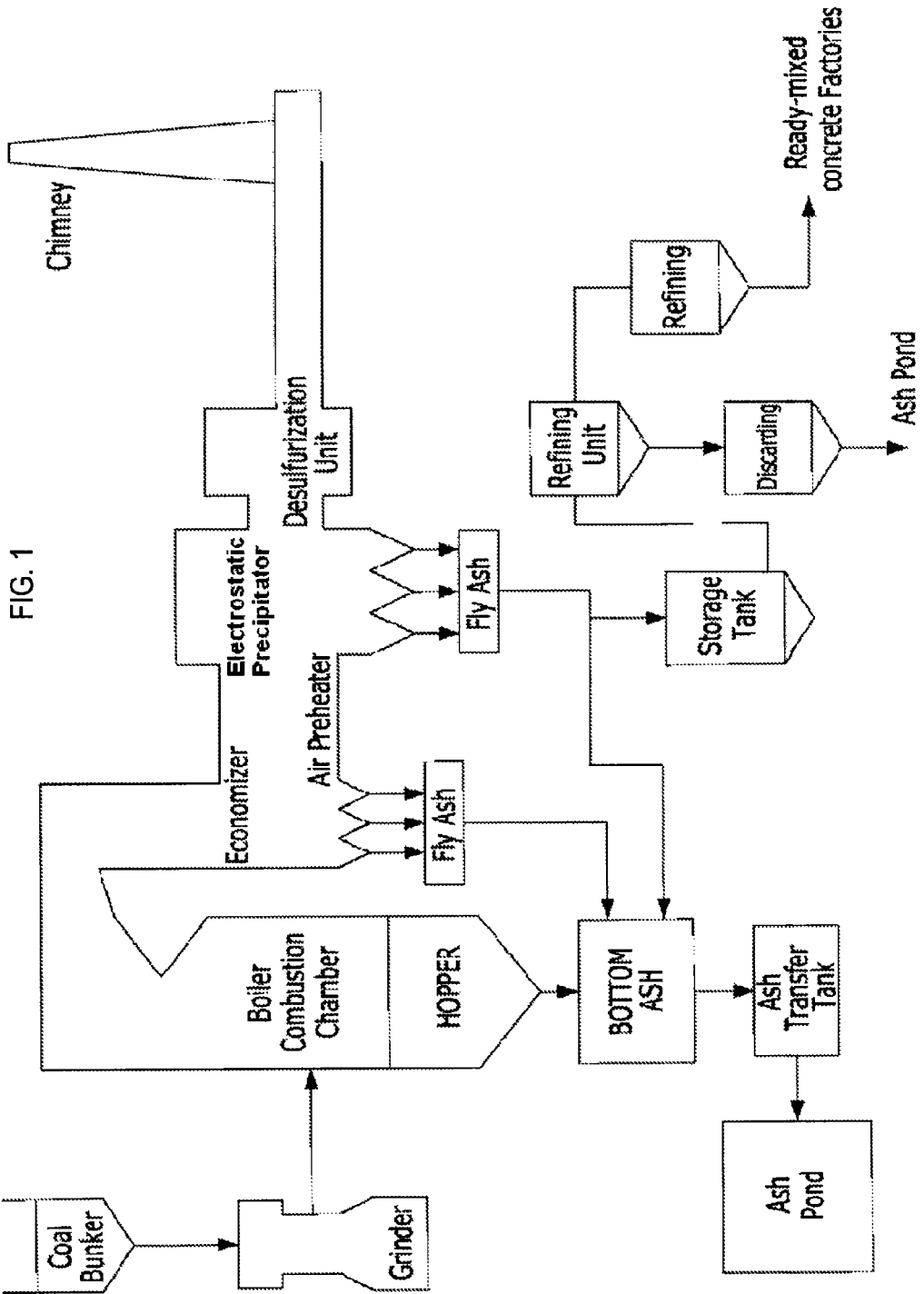
FIG. 1 shows a process in which coal ash is generated in a conventional thermoelectric power plant.

| <Explanation on reference numerals of main elements of drawings> | |
|---|---|
| ☐: | thermoelectric power plant |
| ☐: | reclaimed ash recovery unit |
| ☐: | unburned coal ash recovery unit |
| ☐: | lightweight aggregate manufacturing unit |
| 1: | coal bunker |
| 2: | fine grinder |
| 3: | boiler combustion chamber |
| 4: | hopper |
| 5: | economizer |
| 6: | fly ash |
| 7: | air preheater |
| 8: | electrostatic precipitator |
| 9: | fly ash |
| 10: | washing tower |
| 11: | chimney |
| 12: | bottom ash |
| 13: | ash transfer tank |
| 14: | fly ash storage tank |
| 15: | refining unit |
| 16: | refined ash silo |
| 17: | unrefined ash storage tank |
| 18: | ash pond |
| 19: | washer |
| 20: | screening machine |
| 21: | first feed silo |
| 22: | magnetic separator |
| 23: | second feed silo |
| 24: | unburned coal ash silo |
| 25: | bottom ash silo |
| 26: | grinder |
| 27: | first coal ash silo |
| 28: | second coal ash silo |
| 29: | metering feeder |
| 30: | clay and dredged sand silo |
| 31: | dryer |
| 32: | high-speed mill |
| 33: | raw material silo/metering feeder |
| 34: | kneader |
| 35: | vacuum extruder |
| 36: | pelletizer |
| 37: | extruded material storage silo |
| 38: | formed material storage silo |
| 39: | rotary drying chamber |
| 40: | warehouse |
| 41: | rotary kiln |
| 42: | waste heat supply duct |
| 43: | exhaust duct |
| 44: | cooler |
| 45: | aggregate |
| 100: | forming unit |

BEST MODE FOR CARRYING OUT THE INVENTION

In one aspect, the present invention is directed to an apparatus for recycling coal ash, the apparatus comprising: an unburned coal ash recovery unit for selectively recovering unburned coal ash having a particle size of 2 mm or more from coal ash which is generated from a thermoelectric power plant that generates electricity by burning coal; and an aggregate manufacturing unit for manufacturing aggregate using coal ash remaining after recovering the unburned coal ash through the unburned coal ash recovery unit, and an method for recycling coal ash by using the apparatus.

In another aspect, the present invention is directed to a method for recycling coal ash, which recycles coal ash selected from a group consisting of fly ash, bottom ash, reclaimed ash, and mixtures thereof for specific uses by using the apparatus for recycling coal ash.

In still another aspect, the present invention is directed to a method for manufacturing lightweight aggregate, the method comprising the steps of:

(a) grinding burned coal ash or coal ash having a particle size of less than 2 mm, recovered through an unburned coal ash recovery unit comprising a screening machine 20 for screening coal ash, generated in a thermoelectric power plant, according to particle size using a plurality of screens; a plurality of first feed silos 21 for separately storing the coal ash screened in the screening machine 20; a magnetic separator 22 for separating the coal ash, stored in the first feed silo 21, into a burned portion and an unburned portion using an electromagnet; a plurality of second feed silos 23 for separately recovering the coal ash portions separated by the magnetic separator 22; an unburned coal ash silo 24 for recovering unburned coal ash having a specific particle size or greater from the second feed silos 23 and storing the recovered unburned coal ash; and a bottom ash silo 25 for recovering burned coal ash or coal ash having a particle size of less than 2 mm from the first feed silos 21 and the second feed silos 23 and storing the recovered coal ash;

(b) preparing an aggregate mixture by mixing and kneading the ground coal ash with raw material for aggregate;

(c) manufacturing a aggregate formed material by forming the prepared aggregate mixture into aggregate form; and (d) manufacturing aggregate by calcining the aggregate formed material.

Hereinafter, the present invention will be described in detail with reference to the accompanying drawings.

First, as shown in FIG. 1, in a conventional thermoelectric power plant, coal fed from a coal bunker is pulverized by a grinder and then fed into a boiler combustion chamber in which it is burned. Fly ash which is generated during this process is collected by an electrostatic precipitator and stored in a fly ash storage tank, and then refined by a refining unit. The refined coal ash is mostly used as a concrete admixture in ready mixed concrete factories. Also, a portion of the fly ash collected by the electrostatic precipitator is sent together with bottom ash to an ash pond in which it is landfilled. Thus, the coal ash which is recycled from the conventional thermoelectric power plant has a problem in that, because only some characteristics of the coal ash are selectively employed, the coal ash is not completely recycled.

Figure 2:
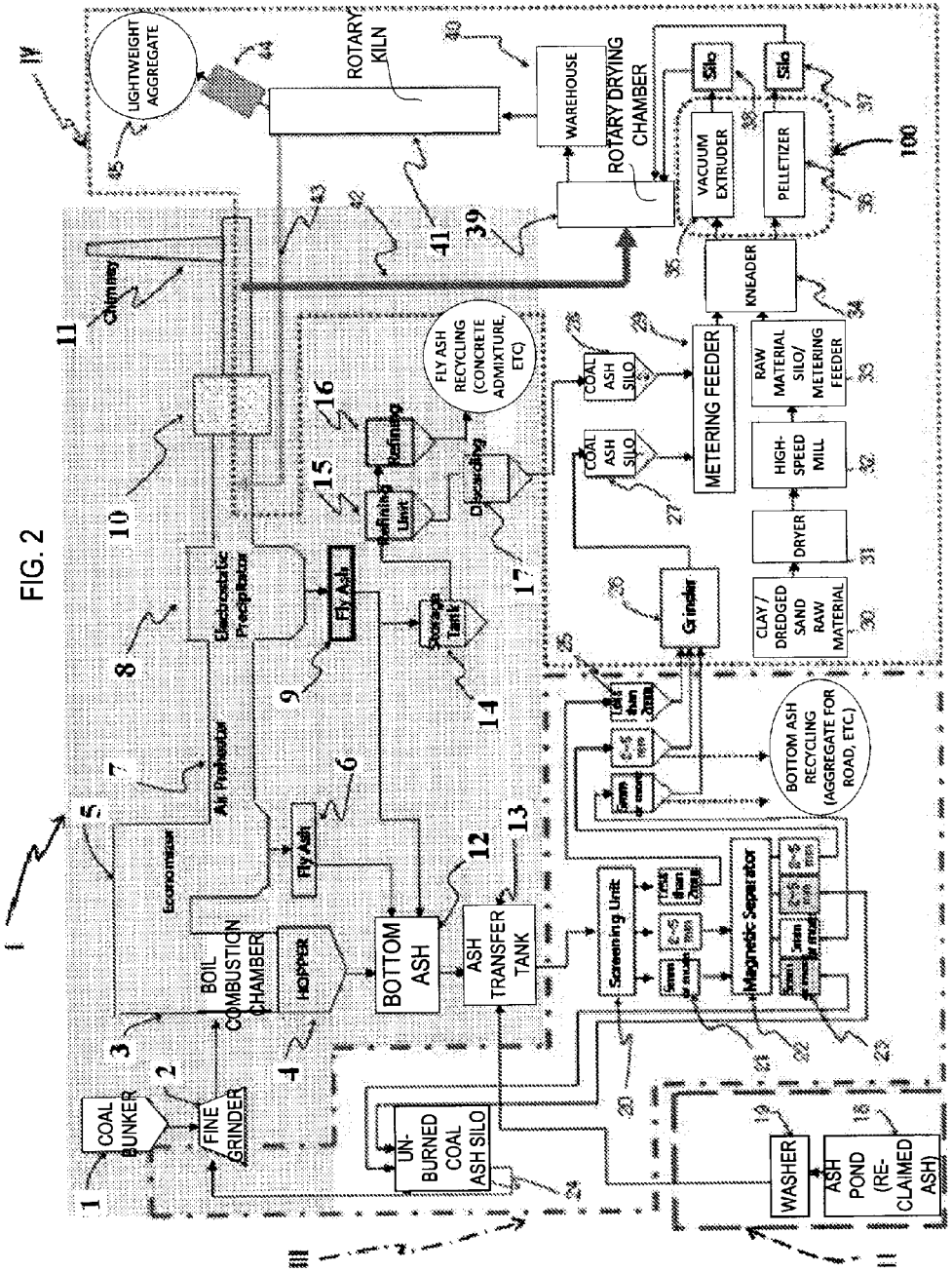
FIG. 2 schematically shows a process in which coal ash is recycled in a thermoelectric power plant comprising an apparatus for recycling coal ash according to the present invention.

To solve this problem, according to the present invention, as shown in FIG. 2, an apparatus for recycling coal ash is provided in a conventional thermoelectric power plant. The apparatus for recycling coal ash comprises: an unburned coal ash recovery unit III which recovers unburned coal ash such that the recovered coal ash can be recycled as fuel; and an aggregate manufacturing unit IV in which aggregate is manufactured using the remainder other than the recovered coal ash. When the apparatus for recycling coal ash is used, coal ash which is generated in a thermoelectric power plant can be completely recycled for purposes such as fuel and aggregate.

The unburned coal ash recovery unit III according to the present invention is a section which recovers unburned coal ash so as to be recycled as fuel. In the unburned coal ash recovery unit, coal ash (bottom ash) which is generated in the bottom of a boiler 3 in a thermoelectric power plant, and coal ash (fly ash) which is generated in an electrostatic precipitator 8 can be separated according to particle size using a screening machine 20 comprising a plurality of screens (not shown).

Herein, the separation of coal ash according to particle size is preferably achieved by separating the coal ash into sizes of 5 mm or more, 2-5 mm and less than 2 mm. After the particle size separation process, coal ash having a particle size of 5 mm or more is recycled as coarse aggregate, and coal ash having a particle size of 2-5 mm is recycled as fine aggregate, such that they can be supplied according to the particle size required for road base materials or concrete secondary products. Coal ash particles having a particle size of 2 mm or less contain a significantly large amount of fine powder, and for this reason, it is difficult to recycle such coal particles for use in road base materials. Thus, the coal ash particles having a particle size of 2 mm or less are completely recovered so as to be recycled as lightweight aggregate.

However, the separation of coal ash according to particle size is not limited to the above-described particles, and the coal ash can be separated into various particle sizes. The coal ashes separated according to particle size using the above-described method are separated using a magnetic separator 22 into a coal ash portion containing unburned coal ash and a coal ash portion containing little or no unburned coal ash. The coal ash portion containing unburned coal ash is transferred into an unburned coal ash silo 24 such that it can be mixed later with coal fuel to be used as electricity generating fuel. Meanwhile, the burned coal ash portion containing little or no unburned coal ash is stored in a bottom ash silo 25.

Meanwhile, the unburned coal ash recovery unit III according to the present invention may further comprise a reclaimed ash recovery unit II for recovering coal ash reclaimed in ash pond, removing impurities from the recovered reclaimed coal ash and screening unburned coal ash having a specific particle size or greater. Herein, the specific particle size is preferably 2 mm or more, but is not limited thereto.

In the present invention, the reclaimed ash recovery unit II recovers reclaimed ash (including fly ash and bottom ash) from an ash pond 18, removes salt, contaminants, impurities and the like from the reclaimed ash and transfers the reclaimed ash into an ash transfer tank 13. Herein, the salt, contaminants, impurities and the like in the reclaimed ash can be removed by washing and dewatering the reclaimed ash using a washer 19.

In the aggregate manufacturing unit IV according to the present invention, coal ash remaining after the unburned coal ash has been recovered as electricity generating fuel by the unburned coal ash recovery unit III can be recycled for specific uses. Particularly, lightweight aggregate can be manufactured using the remaining coal ash.

In the aggregate manufacturing unit IV according to the present invention, coal ash remaining after the unburned coal ash has been recovered as electricity generating fuel by the unburned coal ash recovery unit III is ground to a particle size of about 300-600 μm using a grinder 26. This is because, if particles constituting formed material during the manufacturing of aggregate are not uniform or are excessively large, the aggregate will be likely to be cracked or damaged during a drying or calcining process, and the physical properties of the final aggregate product such as strength or water absorption rate can be adversely affected. The coal ash ground as described above is stored in a first coal ash silo 27, and coal ash (fly ash) collected in the electrostatic precipitator 8 of the thermoelectric power plant is transferred through a refining unit 15 into a second coal ash silo 28. Then, the coal ash stored in the first coal ash silo 27 and the coal ash stored in the second coal ash silo 28 can be metered in a weight and volume suitable for specific use by means of a metering feeder 29.

Meanwhile, clay or dredged sand is stored in a clay/dredged sand silo 30, and then dried in a dryer 31 in order to maintain the plasticity of formed material. Then, it is ground using a high-speed mill 32 and can be metered and stored in a weight and volume suitable for specific use by means of a raw material silo/metering feeder 33.

The coal ash and clay or dredged sand metered as described above are transferred into a kneader 34 in which they are mixed and kneaded such that they can be easily mixed with a raw material for aggregate.

A mixture of the coal ash, subjected to the above-described blending process, and additives, can be formed into aggregate form by a forming unit 100 such as a vacuum extruder 35 and a pelletizer 36, but the scope of the present invention is not limited to this forming method, and lightweight aggregate may be formed by various forming methods. The vacuum extruder 35 can be used to form aggregate requiring high specific gravity and strength or aggregate which is used to construct a building structure requiring durability. The pelletizer 36 can be used to manufacture special-purpose aggregate products having low specific gravity or small particle size.

The aggregate manufactured by this forming method is stored in formed material storage silos 37 and 38, and then the desired amount thereof is transferred and dried in a rotary drying chamber 39. The dried aggregate is stored in a warehouse 40. As a heat source for the rotary drying chamber 39, residual heat remaining after coal-fueled electricity generation may be used. After the above-described forming process, the dried aggregate stored in the warehouse can be calcined in a rotary kiln 41 under conditions for a temperature and time suitable for specific use, thereby manufacturing aggregate 45.

According to the method for recycling coal ash in which coal ash selected from the group consisting of fly ash, bottom ash, reclaimed ash and mixtures thereof can be recycled for specific purposes using the apparatus for recycling coal ash of the present invention, the contamination of the surrounding environment which occurs when waste is transferred to a recycling factory can be prevented, transportation expenses can be reduced, and coal ash which is generated in a thermoelectric power plant can be completely recycled, unlike the prior art in which the coal ash is partially recycled for limited uses.

According to the method for manufacturing lightweight aggregate of the present invention, lightweight aggregate can be manufactured by recovering and grinding the burned coal ash and the coal ash having a particle size of less than 2 mm, stored in the bottom ash silo 25 of the unburned coal ash recovery unit II, mixing and kneading the ground coal ash with a raw material for aggregate to prepare an aggregate mixture, manufacturing am aggregate formed material by forming the prepared aggregate mixture into aggregate form, and manufacturing aggregate by calcining the formed aggregate formed material.

In the present invention, the raw material for aggregate may be clay or dredged sand.

EXAMPLES

Hereinafter, the present invention will be described in further detail with reference to examples. It will be obvious to a person having ordinary skill in the art that these embodiments are merely for illustrative purposes, and the scope of the present invention should not be construed as being limited to the above described embodiments.

Example 1

Measurement of Chemical Substances and Leaching of Hazardous Substances of Raw Materials The chemical components of red clay (Asan Industrial Co., Ltd., Hongsung, Choongchungnam-do, Korea), dredged sand (Young-Heung thermal power plant, Korea) and reclaimed ash (Young-Heung thermal power plant, Korea) required for manufacturing aggregate were measured according to the chemical analysis and testing methods of KS L 4007 (chemical analysis method of clay). Also, the leaching of hazardous substances contained therein was measured using an ICP-AES instrument (JOVINYVON 138 ultima2c, Holland).

As a result, as shown in Table 1 below, the reclaimed ash contained a significantly large amount of unburned carbon, suggesting that it can be recycled as electricity generating fuel. The dredged sand showed chemical components similar to those of red clay, suggesting that it can serve to increase the formability and plastic strength of a raw material mixed therewith, and thus can be used as a raw material for manufacturing lightweight aggregate. However, the dredged sand contains salt, such that, when it is taken out to the outside and landfilled, expenses such as transportation expenses are incurred, or when it is dumped at sea after stored in the power plant, it can cause environmental problems. Thus, when the dredged sand is used as a raw material for manufacturing lightweight aggregate in the power plant, raw material costs can be reduced, and environmental contamination caused by the dredged sand can also be reduced.

TABLE 1

| section | Ig loss | $SiO_2$ | $Al_2O_3$ | $Fe_2O_3$ | CaO | MgO | $Na_2O$ | $K_2O$ | $TiO_2$ | $ZrO_2$ | $P_2O_5$ | $Cr_2O_3$ | MnO | C |
|---|---|---|---|---|---|---|---|---|---|---|---|---|---|---|
| Red clay | 7.38 | 59.82 | 19.59 | 8.77 | 0.23 | 0.63 | 0.19 | 2.15 | 1.02 | — | 0.13 | — | — | — |
| Dredged sand | 4.08 | 70.71 | 14.38 | 3.82 | 0.79 | 0.18 | 2.51 | 2.70 | 0.80 | — | 0.03 | — | — | — |
| Reclaimed ash | 4.07 | 45.54 | 18.59 | 8.07 | 2.17 | 0.78 | 0.18 | 0.51 | 1.33 | 0.33 | 0.24 | 0.01 | 0.05 | 18.05 |

Example 2

Separation of Reclaimed Ash According to Particle Size and Measurement Ignition Loss The reclaimed ash of Example 1 was washed and then separated according to particle size using a screen. The separated reclaimed ash was burned in an electric furnace under conditions of heating rate of 3.8° C./min, peak temperature of 1150° C. and maintenance time of 1 hour, and the ignition loss of the burned reclaimed ash was measured to determine the content of unburned components in the reclaimed ash according to the particle size.

As a result, as shown in FIG. 2, the reclaimed ash having a particle size of 5 mm or more showed the highest ignition loss of 24.6%, and the reclaimed ash having a particle size of 1.2-2 mm and the reclaimed ash having a particle size of 2-5 mm showed the second and third higher ignition losses. The reclaimed ash having a particle size smaller than 1.2 mm or less showed an insignificant level of ignition level.

TABLE 2

| section | Particle size of the reclaimed ash | Weight percentage of the particle (%) | Ignition loss % |
|---|---|---|---|
| 1 | 5 mm or more | 11.74 | 24.6 |
| 2 | 2 mm~5 mm | 17.25 | 13.4 |
| 3 | 1.2 mm~2 mm | 11.45 | 14.6 |
| 4 | 600 μm~1.2 mm | 9.57 | 6.1 |
| 5 | 300 μm~600 μm | 7.97 | 3.8 |
| 6 | 150 μm~300 μm | 14.78 | 6.6 |
| 7 | Less than 150 μm | 27.25 | 6.7 |

Example 3

Magnetic Separation of Reclaimed Ash and Measurement of Ignition Loss

The reclaimed ash separated according to particle size in Example 2 was subjected to magnetic separation using a magnetic separator (International Process System Co, USA; employing a permanent magnetic such as Photo 3-10), made of a rare earth metal alloy (Nd—Fe—B) and having a magnetic flux density of 10,000 gauss. To measure the ignition loss of the reclaimed ash subjected to magnetic separation, the reclaimed ash was burned in an electric furnace under conditions of heating rate of 3.8° C./min, peak temperature of 1150° C. and maintenance time of 1 hour.

Figure 3:
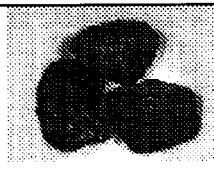
FIG. 3 provides Table 3 disclosing the coal ash of No. 1 subjected to magnetic separation showed a black color, because it contained carbon as its main component and the coal ash of No. 2, not subjected to magnetic separation, was close to gray and showed a porous particle structure.
Figure 3:
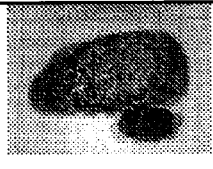
Figure 3:
Figure 3:
Figure 3:
Figure 3:
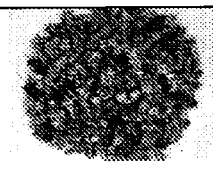

As a result, as shown in Table 3 in FIG. 3, the coal ash of No. 1 subjected to magnetic separation showed a black color, because it contained carbon as its main component. The coal ash of No. 2, not subjected to magnetic separation, was close to gray and showed a porous particle structure.

Also, as shown in Table 4 below, the coal ash of No. 1 contained carbon as its main component, and thus showed an ignition loss higher than the coal ash of No. 2.

TABLE 4

| Section | Particle size of the reclaimed ash | Weight percentage of the particle (%) | Ignition loss % |
|---|---|---|---|
| 1 | 5 mm or more (No. 1) | 6.70 | 38.36 |
| 2 | 5 mm or more (No. 2) | 5.03 | 4.6 |
| 3 | 2~5 mm (No. 1) | 5.42 | 36.48 |
| 4 | 2~5 mm (No. 2) | 11.83 | 4.4 |
| 5 | 0.6~2 mm (No. 1) | 4.47 | 35.76 |
| 6 | 0.6~2 mm (No. 1) | 24.52 | 6.1 |
| 7 | less than 0.6 mm | 42.03 | 6.4 |

Examples 4

Manufacturing of Artificial Lightweight Aggregate and Measurement of Leaching of Hazardous Substances Using the same lightweight aggregate manufacturing system as the aggregate manufacturing unit of a thermoelectric power plant comprising the coal ash recycling apparatus shown in FIG. 2, artificial lightweight aggregate was manufactured by mixing 60 wt % of the reclaimed ash of Table 4 (except for Nos. 1 and 3) of Example 3 with 20 wt % of clay and 20 wt % of dredged sand, forming the mixture into aggregate using each of a vacuum extruder and a pelletizer, drying the formed aggregate to a water content of 10% or less at a temperature of 200° C. or lower, calcining the formed aggregate in a rotary kiln at a peak temperature of 1150° C. at a heating rate of 19° C./min for 50 minutes, cooling the calcined aggregate at a rate of 150° C./min, and discharging the cooled aggregate into the atmosphere at a temperature of 250° C. The physical properties of the manufactured artificial lightweight aggregate and the leaching of hazardous substances thereof were measured.

Among the physical properties of the artificial lightweight aggregate, the density in saturated surface-dry condition and the absorption rate were measured according to KS F 2503 (testing of density and absorption rate of coarse aggregate), and the fineness modulus was measured according to KS F 2526 (aggregate for concrete). The potential alkali reactivity was measured according to KS F 2545 (test method for potential alkali reactivity of aggregate), and the leaching of hazardous substances was measured according to the official wastes test method.

Figure 4:
FIG. 4 provides Table 5 disclosing the physical properties of lightweight aggregate 1 manufactured using the pelletizer showed an absorption rate of 16.29%, a density of saturated surface-dry condition of 1.45 g/cm$^3$ and a fineness modulus of 6.87%.
Figure 4:

As a result, as shown in Table 5 in FIG. 4, the physical properties of lightweight aggregate 1 manufactured using the pelletizer showed an absorption rate of 16.29%, a density of saturated surface-dry condition of 1.45 g/cm$^3$ and a fineness modulus of 6.87%. Also, as shown in Table 6 below, no hazardous substance was detected in lightweight aggregate 1.

Meanwhile, the physical properties of lightweight aggregate 2 manufactured using the vacuum extruder showed an absorption rate of 15.26%, a density in saturated surface-dry state of 1.68 g/cm$^3$ and a fineness modulus of 6.76%. Also, as shown in Table 6, no hazardous substance was detected in lightweight aggregate 2.

TABLE 6

| | leaching of hazardous substances (mg/L) | | | | | | | |
|---|---|---|---|---|---|---|---|---|
| Section | Pb | Cd | Cr | Cu | As | Hg | Zn | Ni |
| lightweight aggregate 1 | none | none | none | none | none | none | none | none |
| lightweight aggregate 2 | none | none | none | none | none | none | none | none |

Example 5

Measurement of Compressive Strength of Concrete Manufactured Using Artificial Lightweight Aggregate Concretes were manufactured using the lightweight aggregates manufactured in Example 4, and the compressive strengths thereof were measured and compared. Preparation Example 2 in Table 7 below is concrete manufactured using lightweight aggregate 1 of Table 5 in FIG. 4, and Preparation Examples 1 and 3 in Table 7 are concretes manufactured using lightweight aggregate 2 of Table 5 in FIG. 4. Concrete specimens were manufactured according to KS F 2403 (method for manufacturing specimens for testing strength of concrete) and cured for 28 days, and then the compressive strengths thereof were measured according to KS F 2405 (test method for compressive strength of concrete).

For comparison with Preparation Examples, concretes were manufactured using the following aggregates. Comparative Example 1 in Table 7 is general crushed aggregate (Gwangcheon-eup, Hongseong-gun, Chungcheongnam-do, Korea) used in conventional concrete, Comparative Example 2 is imported artificial lightweight aggregate (Liapor, Germany), and Comparative Examples 3 and 4 were using domestic reclaimed ashes (Young-Heung thermal power plant, Korea). Concretes were manufactured using the aggregates of Comparative Examples in the same manner as Preparation Examples, and the compressive strengths thereof were measured in the same manner as Preparation Examples.

As a result, as shown in Table 7 below, when the concrete of Comparative Example 1 comprising conventional crushed aggregate was compared with the lightweight aggregate concretes of Preparation Examples 1, 2 and 3 comprising reclaimed ash, the crushed aggregate concrete of Comparative Example 1 had a compressive strength of 23.0 N/mm$^2$, whereas the artificial lightweight aggregate concretes of Preparation Examples 1 and 2 comprising reclaimed ash showed compressive strengths of 20.0 N/mm$^2$ and 19.8 N/mm$^2$, respectively, which were similar to those of conventional crushed aggregate concretes. Particularly, the concrete of Preparation Example 3 showed a compressive strength of 26.6 N/mm$^2$, which was higher than that of the crushed aggregate concrete. Also, the concrete of Comparative Example 2 showed a compressive strength of 14.1 N/mm$^2$, which was significantly lower than those of the lightweight aggregate concretes of Preparation Examples 1, 2 and 3, suggesting that it is required to add a strength reinforcement such as fumed silica when the concrete is manufactured. The concretes of Comparative Examples 3 and 4 were manufactured using non-processed reclaimed ash from ash pond and showed compressive strengths of 7.2 N/mm$^2$ and 9.1 N/mm$^2$, suggesting that the reclaimed ash of Comparative Examples 3 and 4 is significantly unsuitable for use in concrete and that it is necessarily required to pretreat the reclaimed ash in order to use the reclaimed ash in concrete.

TABLE 7

| Section | Raw materials and mixing ratio (kg/m$^3$) | | | | | Compressive strengh (N/mm$^2$) |
| --- | --- | --- | --- | --- | --- | --- |
| | cement | Fine aggregate | Coarse aggregate | S/A(%) | W/C(%) | Type of aggregate | |
| Comparative Example 1 | 330 | 811 | 918 | 47 | 55 | crushed aggregate | 23.0 |
| Comparative Example 2 | 345 | 781 | 440 | 45 | 50 | lightweight aggregate (L, Germany) | 14.1 |
| Comparative Example 3 | 314 | 828 | 589 | 47 | 55 | Reclaimed ash | 7.2 |
| Comparative Example 4 | 330 | 811 | 578 | 47 | 55 | Reclaimed ash | 9.1 |
| Preparation Example 1 | 314 | 828 | 635 | 47 | 55 | ecological lightweight aggregates | 20.0 |
| Preparation Example 2 | 330 | 811 | 622 | 47 | 55 | ecological lightweight aggregates | 19.8 |
| Preparation Example 3 | 345 | 815 | 626 | 47 | 50 | ecological lightweight aggregates | 26.6 |

As can be seen from the results in Table 7 above, the lightweight aggregate concrete comprising the reclaimed ash had excellent compressive strength compared to the conventional crushed concrete. Also, it can be seen that the lightweight aggregate concrete can solve either the problem in that concrete comprising non-processed reclaimed ash is difficult to apply to concrete products because of its low strength or the problem in that, when concrete is manufactured using lightweight aggregate, the production cost is increased because an expensive strength reinforcement is added because of the low strength of the lightweight aggregate.

INDUSTRIAL APPLICABILITY

As described in detail above, the apparatus and method for recycling coal ash according to the present invention can prevent the surrounding environment from being contaminated during the transportation of waste to a recycling factory and can also reduce transportation expenses. Moreover, the apparatus and method of the present invention allow coal ash to be completely recycled for specific uses, such that unburned carbon contained in the coal ash can be used. Also, the apparatus and method of the present invention allow coal ash to be recycled even as concrete admixtures having strict standards. In addition, the present invention can prevent environmental contamination caused by the landfilling of waste and recycle waste, thereby reducing the loss of land and the waste of resources.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

The invention claimed is:

1. An apparatus for recycling coal ash, the apparatus comprising:
   an unburned coal ash recovery unit for selectively recovering unburned coal ash having a particle size of 2 mm or more from coal ash which is generated from a thermoelectric power plant that generates electricity by burning coal; and
   an aggregate manufacturing unit for manufacturing aggregate using coal ash remaining after recovering the unburned coal ash through the unburned coal ash recovery unit; and
   wherein the unburned coal ash recovery unit comprises:
   a screening machine 20 comprising a plurality of screens configured to screen coal ash generated in a thermoelectric power plant according to particle size;
   a plurality of first feed silos 21 configured to separately store the coal ash screened in the screening machine 20;
   a magnetic separator 22 comprising an electromagnet configured to separate the coal ash stored in the first feed silos 21 into a burned portion and an unburned portion;
   a plurality of second feed silos 23 configured to separately recover the coal ash portions separated by the magnetic separator 22;

an unburned coal ash silo 24 configured to recover unburned coal ash having a specific particle size or greater from the second feed silos 23 and store the recovered unburned coal ash; and a bottom ash silo 25 configured to recover burned coal ash or coal ash having less than a specific particle size from the first feed silos 21 and the second feed silos 23 and store the recovered coal ash, thereby recovering unburned coal ash having a particle size of 2 mm or more through a particle and magnetic separating process and transferring the unburned coal ash to a thermoelectric power plant.

2. The apparatus for recycling coal ash according to claim 1, wherein the unburned coal ash recovery unit further comprises a separator configured to recover coal ash reclaimed in an ash pond, remove impurities from the recovered coal ash, and screen unburned coal ash having a particle size of 2 mm or more.

3. The apparatus for recycling coal ash according to claim 1, wherein the aggregate manufacturing unit comprises:

a grinder 26 for recovering coal ash stored in bottom ash silo 25 of the unburned coal ash recovery unit III and grinding the recovered coal ash;

a first coal ash silo 27 for storing the ground coal ash through the grinder 26;

a second coal ash silo 28 for storing fly ash generated from the thermoelectric power plant I;

a metering feeder 29 for metering coal ash stored in the first coal ash silo 27 and the second coal ash silo 28 in a weight and volume suitable for a specific mixing ratio;

a kneader 34 for mixing and kneading coal ash metered through the metering feeder 29 with raw materials for aggregate;

a forming unit 100 for forming a mixture mixed and kneaded through the kneader 34 into aggregate form;

a rotary drying chamber 39 for drying the mixture formed into aggregate form in the forming unit 100; and a rotary kiln 41 for calcining the mixture dried in the rotary drying chamber 39 and manufacturing aggregate.

4. The apparatus for recycling coal ash according to claim 3, wherein the rotary drying chamber 39 is connected with a thermoelectric power plant and uses residual heat of the thermoelectric power plant.

5. A method for recycling coal ash, which recycles coal ash selected from a group consisting of fly ash, bottom ash, reclaimed ash, and mixtures thereof for specific uses by using the apparatus for recycling coal ash of claim 1.

6. A method for manufacturing lightweight aggregate, the method comprising the steps of:

(a) grinding burned coal ash or coal ash having a particle size of less than 2 mm, recovered through an unburned coal ash recovery unit comprising a screening machine 20 for screening coal ash, generated in a thermoelectric power plant, according to particle size using a plurality of screens; a plurality of first feed silos 21 for separately storing the coal ash screened in the screening machine 20; a magnetic separator 22 for separating the coal ash, stored in the first feed silo 21, into a burned portion and an unburned portion using an electromagnet; a plurality of second feed silos 23 for separately recovering the coal ash portions separated by the magnetic separator 22; an unburned coal ash silo 24 for recovering unburned coal ash having a specific particle size or greater from the second feed silos 23 and storing the recovered unburned coal ash; and a bottom ash silo 25 for recovering burned coal ash or coal ash having a particle size of less than 2 mm from the first feed silos 21 and the second feed silos 23 and storing the recovered coal ash;

(b) preparing an aggregate mixture by mixing and kneading the ground coal ash with raw material for aggregate;

(c) manufacturing a aggregate formed material by forming the prepared aggregate mixture into aggregate form; and (d) manufacturing aggregate by calcining the aggregate formed material.

7. The method for manufacturing lightweight aggregate according to claim 6, wherein the raw material for aggregate is clay or dredged sand.

* * * * *